United States Patent [19]

Batzle et al.

[11] Patent Number: 4,984,652
[45] Date of Patent: Jan. 15, 1991

[54] TORSIONAL WAVE LOGGING TOOL

[75] Inventors: Michael L. Batzle; Kenneth M. Tubman, both of Plano, Tex.

[73] Assignee: Atlantic Richfield Company, Los Angeles, Calif.

[21] Appl. No.: 297,167

[22] Filed: Jan. 13, 1989

[51] Int. Cl.$^5$ .............................................. G01V 1/40
[52] U.S. Cl. ..................................... 181/104; 181/106; 367/75
[58] Field of Search ................... 181/104, 106; 367/27, 367/31, 75

[56] References Cited

U.S. PATENT DOCUMENTS

| | | | |
|---|---|---|---|
| 4,319,345 | 3/1982 | Dennis | 367/25 |
| 4,649,525 | 3/1987 | Angone et al. | 367/31 |
| 4,649,526 | 3/1987 | Winbow et al. | 367/35 |
| 4,682,308 | 7/1987 | Chung | 367/31 |
| 4,685,091 | 8/1987 | Chung et al. | 367/31 |
| 4,698,792 | 10/1987 | Kurkjien et al. | 367/31 |
| 4,700,803 | 10/1987 | Mallett et al. | 181/106 |

FOREIGN PATENT DOCUMENTS

| | | | |
|---|---|---|---|
| 0224372 | 6/1987 | European Pat. Off. | |
| 0591236 | 2/1978 | U.S.S.R. | 181/104 |

Primary Examiner—Ian J. Lobo
Attorney, Agent, or Firm—Michael E. Martin

[57] ABSTRACT

The shear velocity of a region of an earth formation may be determined by a logging tool insertable in a wellbore penetrating the formation which includes plural transducers for generating compressional waves for transmission through the formation as shear wave between the signal generating transducers and an array of signal receiving transducers spaced from the signal generating transducers. The transducers may be plural in number and arranged to effect impingement of the compressional wave on the borehole wall at an angle of incidence preferably in the range of 35° to 75° to a normal to the wall surface. The transducer array is controlled so that a significant portion of the compressional wave energy transmitted through liquid in the wellbore is converted to shear waves at the wellbore wall, which shear waves constructively interfere to develop a torsional wave propagating along the wellbore between the transducers and the receiver elements. Strong shear waves are thus generated in formation materials where the shear velocity may not be otherwise measurable.

10 Claims, 2 Drawing Sheets

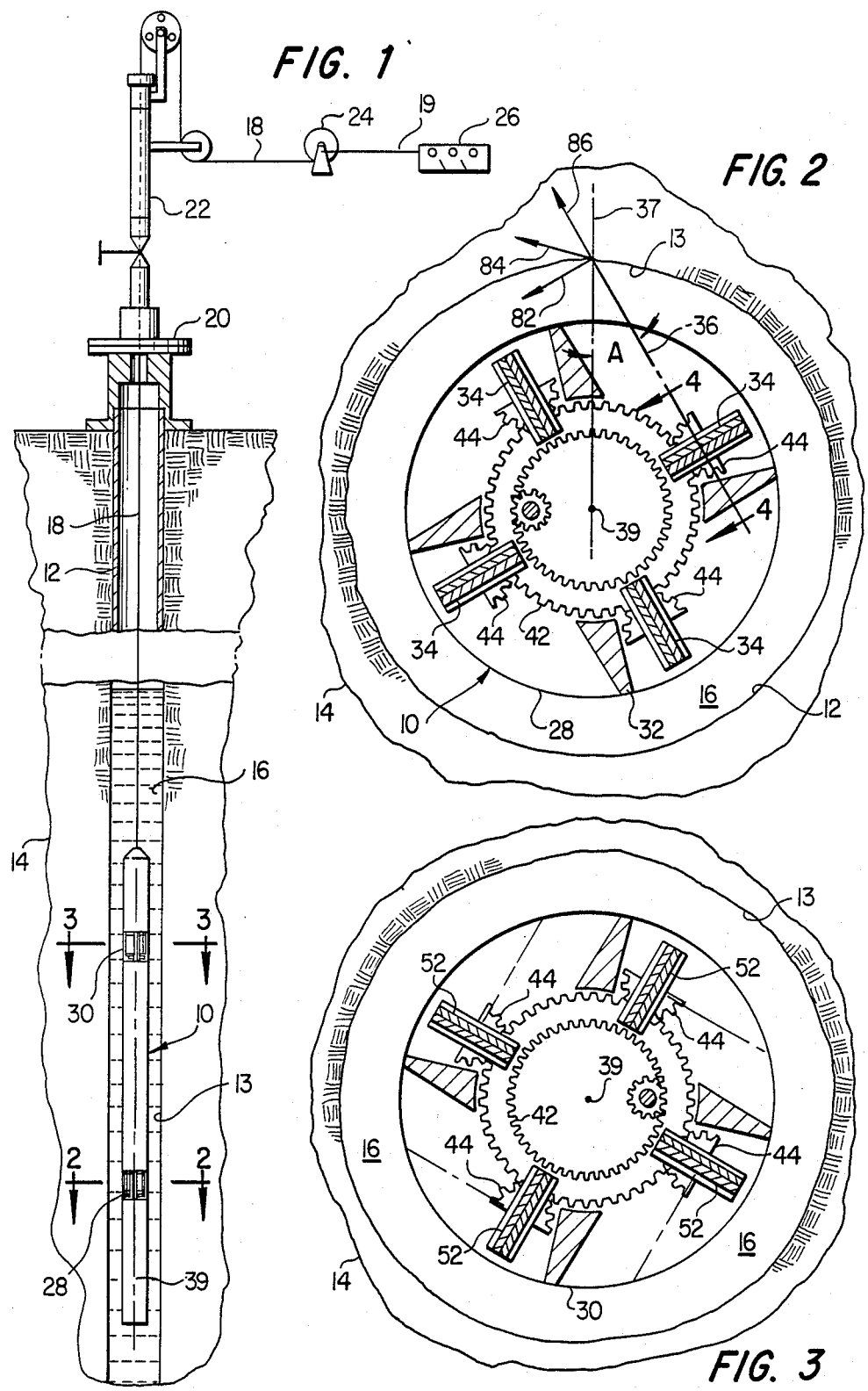

TORSIONAL WAVE LOGGING TOOL

BACKGROUND OF THE INVENTION

1. Field of the Invention

The present invention pertains to an acoustic logging tool adapted to generate shear waves in an earth formation having a torsional propagation characteristic with respect to the borehole axis.

2. Background

In acoustic well logging, an array of acoustic transducer elements for both transmission and receiving of acoustic wave signals may be arranged in a sonde or tool which is disposed in the wellbore to provide information
useful in indicating certain conditions and properties of
the formation in the vicinity of the tool. The acoustic waves generated by the tool are typically characterized as compression waves, shear waves, and pseudo-rayleigh waves.

Certain formation properties and characteristics may be determined by measuring the shear wave velocity in the formation with respect to or about the borehole axis. U.S. Pat. Nos. 3,593,255 to White, U.S. Pat. No. 4,649,525 to Angona et al, U.S. Pat. No. 4,649,526 to Winbow et al, U.S. Pat. No. 4,682,308 to Chung, U.S. Pat. No. 4,698,792 to Kurkjian et al, and U.S. Pat. No. 4,700,803 to Mallett et al and European Patent Publication No. 0224372 to Mobil Oil Corporation disclose various aspects of shear wave generating and receiving apparatus for acoustic well logging tools. However, all of these references discuss shear wave tools which generate radially outwardly directed pulses of acoustic energy in different patterns to "flex" or "pluck" the formation around the wellbore by pushing it, in effect, sideways at some point and this disturbance then propagates axially. However, by torsionally deflecting the formation around the wellbore in accordance with the method and apparatus of the present invention a fundamentally different propagation mode is developed and different formation characteristics may be measured and used in analysis of formation properties for various purposes.

SUMMARY OF THE INVENTION

The present invention provides an apparatus for use in acoustic well logging wherein acoustic energy is imparted to a formation surrounding a wellbore in a manner which torsionally propagates through the formation about the wellbore axis and is measured by receiving means for use in determining certain characteristics and properties of the formation in the vicinity of the wellbore. In accordance with an important aspect of the present invention an apparatus is provided which comprises an array of transmitter elements spaced axially in a wellbore from a similar array of receiving elements and arranged such that acoustic energy is controlled to be converted to so-called shear waves at the wellbore wall. The shear waves travel both axially and torsionally with respect to the wellbore axis so as to develop a torsional wave propagating along the wellbore.

In accordance with another aspect of the present invention an acoustic well logging apparatus is provided in which acoustic waves generated by the apparatus are controlled to impinge the wellbore wall at a selected incident angle to maximize the transmission of acoustic energy into the formation. The shear waves thus generated are propagated as a so-called torsional wave through the formation along the wellbore between transmitting elements and receiving elements of the logging apparatus.

In accordance with still further aspects of the present invention an apparatus is provided wherein an array of transducers or vibratory wave generators may be arranged for generating a so-called torsional wave in a formation in the vicinity of a wellbore. The transducer elements may take various configurations and may comprise so-called bender bar type transducers characterized by an arrangement of piezoelectric elements suitably secured together to form a flexural member. The transducers or transmitter elements are arranged in a particular array and are excited in a selected mode so that shear waves are generated which constructively interfere to generate a so-called torsional wave with respect to the wellbore axis. This torsional wave propagates along the wellbore and is transmitted back to an array of receiving elements spaced from the transmitter elements and normally through an intermediate medium such as a liquid filling the borehole in the vicinity of the apparatus.

In accordance with yet another aspect of the present invention there is provided an acoustic logging apparatus particularly adapted for measuring shear wave velocity in formations in which the shear wave velocity is lower than the velocity of the fluid in the wellbore such as in rather soft or so-called weak formations. By controlling the incident angle of the acoustic energy transmitted to the borehole wall with an array of transmitter elements wherein this energy provides waveforms which constructively interfere a so-called torsional wave is propagated along the formation in the vicinity of the wellbore having been converted to shear wave energy at the wellbore wall.

The above-noted advantages and superior aspects of the present invention together with other features thereof will be further appreciated by those skilled in the art upon reading the detailed description which follows.

BRIEF DESCRIPTION OF THE DRAWING

FIG. 1 is a view in somewhat schematic form of a wellbore penetrating, a formation and having disposed therein an acoustic well logging tool in accordance with the present invention;

FIG. 2 is a section view, also in somewhat schematic form, taken generally along the line 2—2 of FIG. 1;

FIG. 3 is a section view taken generally along the line 3—3 of FIG. 1;

DESCRIPTION OF A PREFERRED EMBODIMENT

Figure 4:
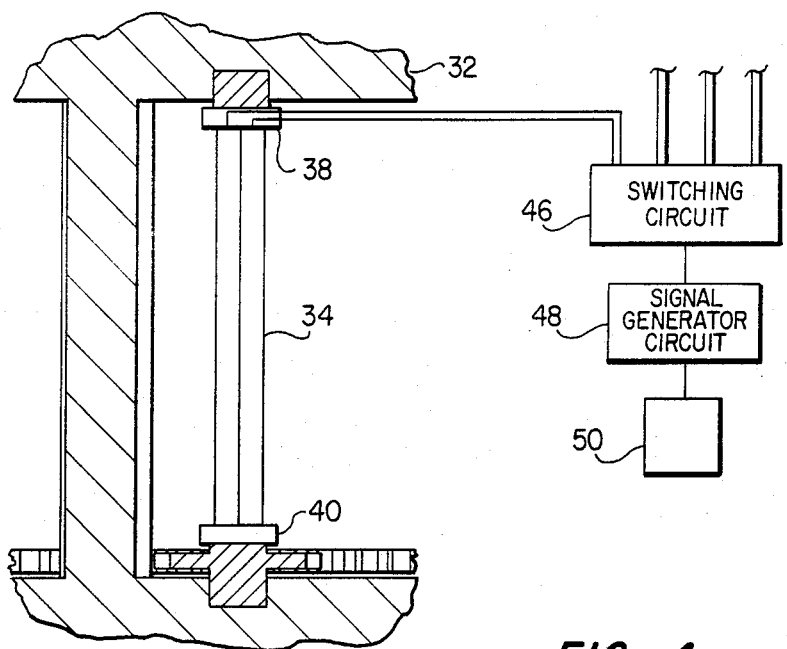
FIG. 4 is a section view taken generally along the line 4—4 of FIG. 2.

In the description which follows, like parts are marked throughout the specification and drawing with the same reference numerals, respectively. The drawing figures are not to scale and certain elements are represented in general or somewhat schematic form only.

The development of shear wave, or in the case of the present invention, torsional wave logging systems is desirable in order to overcome the signal interference created by the propagation of compression waves through borehole fluid when attempting to carry out logging operations using tools which primarily create compression or so-called P waves. U.S. Pat. Nos. 3,593,255 to White, U.S. Pat. Nos. 4,682,308 to Chung, U.S. Pat. Nos. 4,649,256 to Winbow et al and U.S. Pat. Nos. 4,649,525 to Angona et al are exemplary of efforts to develop so-called shear wave logging systems for use in acoustic well logging processes. The present invention contemplates the utilization of shear waves in such a manner that a so-called torsional wave is induced in the formation with respect to the borehole axis and is propagated between a wave generating source or transmitting means and a receiving means whereby the characteristics of the formation may be studied by the use of acoustic signals of improved quality.

Referring to FIG. 1, there is illustrated an acoustic logging apparatus or tool in accordance with the present invention and generally designated by the numeral 10. The logging tool 10 is illustrated as being disposed in a wellbore 12 penetrating an earth formation 14 of moderately hard material typically having compression wave velocities of less than about 15,000 feet per second in the region of interest. At least the portion of the wellbore 12 in which the tool 10 is operable is an uncased or open-hole portion 13 and is filled with a liquid 16 which may typically be a drilling fluid or "mud". The tool 10 is suspended in the wellbore 12 by way of a conventional cable or wireline 18 extending through a wellhead 20 and a suitable lubricator and stuffing box assembly 22. The cable 18 is reeled on a suitable motorized drum 24 and suitable electrical signal conductors 19 are provided between the cable 18 and a surface control unit 26.

The tool 10 includes spaced apart signal transmitter and receiver sections 28 and 30, portions of which are described in further detail herein. For example, as shown in FIG. 2, the section 28 of the tool 10 includes a housing member 32 which is adapted to support a plurality of circumferentially and equally spaced apart acoustic signal generating transducer elements 34 which are adapted to flex or vibrate in such a way that a compressional acoustic wave is directed along an axis 36 toward the wall defining the uncased wellbore portion 13. The transducer elements 34 are each suitably mounted for rotation whereby the propagation path represented by the axis 36 may be moved to change the angle of intersection or incidence "A" with respect to a normal 37 to the wellbore wall as illustrated in FIG. 2.

The elements 34 may be of a flexural type utilizing piezoelectric material or some form of magnetostrictive mechanism such as described in the Mallett et al patent. As shown in FIGS. 2 and 4 the transducer elements 34 may be mounted on spaced apart support members 38 and 40 which are supported by the housing member 32 in a manner to permit a change in the directional attitude of the axis 36 so that the wave generated by the transducer elements may impinge on the borewall 13 at a selected angle of incidence A, see FIG. 2, with respect to the normal 37. The normal 37 also passes through the longitudinal central axis 39 of the tool and which is typically coincident with the axis of the wellbore when the tool is in a working position. At least one of the supports such as the support 40 may be provided with means for rotating the elements 34 in unison to change their angle of incidence with respect to the borehole wall 13. An arrangement of a ring gear 42 which is meshed with sector gears 44 associated with each of the support members 40 is illustrated. Each of the transducer elements 34 is suitably electrically connected to a switching circuit 46, FIG. 4, which is, in turn, connected to a signal generating circuit 48 in communication with a suitable source of electrical energy 50.

A preferred mode of operation of the transducer elements 34 would be to energize the elements to flex at a selected frequency so that a torsional acoustic wave is propagated up through the formation and re-enters the wellbore 12 in the vicinity of the receiver section 30 so that the wave is transmitted by the liquid 16 to impinge on plural, circumferentially spaced apart receiver elements 52, see FIG. 3. The elements 52 may be constructed similar to the elements 34 and responsive to mechanical deflection to generate an electrical signal related to such deflection. The elements 52 are supported on a housing section 33 similar to the housing section 32 and may also be mounted in a manner similar to the elements 34 so that they may be focused in a predetermined direction with respect to the borewall 13 in order to increase their sensitivity to the waves being transmitted from the formation back through the medium 16 in the wellbore 12 to impinge on the elements 52. It is contemplated that any irregularities in the surface of the borewall 13 will enhance the transmissivity of the torsional wave signal from the formation 14 back to the transducer elements 52. Alternatively, it may be desirable to provide receiver-transducer elements which are disposed in much closer proximity to the borewall 13 or actually physically engage the borewall to sense the deflection of the wellbore caused by the shear wave propagating therealong.

The exemplary apparatus described in conjunction with FIGS. 1 through 4, comprising an acoustic well logging tool having an array of transducer elements 34 and 52 for transmitting and receiving acoustic signals, may be suited for wellbores of different diameters and formations of materials which have an acoustic compression wave velocity in the range of from 7,500 feet per second to 15,000 feet per second. By energizing the transducer elements 34 simultaneously, constructive interference of the pulsed waveforms will yield a torsional wave which will necessarily propagate up and down the wellbore 12. In view of the fact that a torsional wave has particle motion which is essentially parallel to the borehole 13, the aforementioned type of receiver which is in contact with the wall may be required or, in the event of substantial irregularities in the borewall, sufficient compressional energy may be transmitted into the wellbore fluid and to receiver transducers or elements of the type illustrated in FIG. 3.

Figure 5:
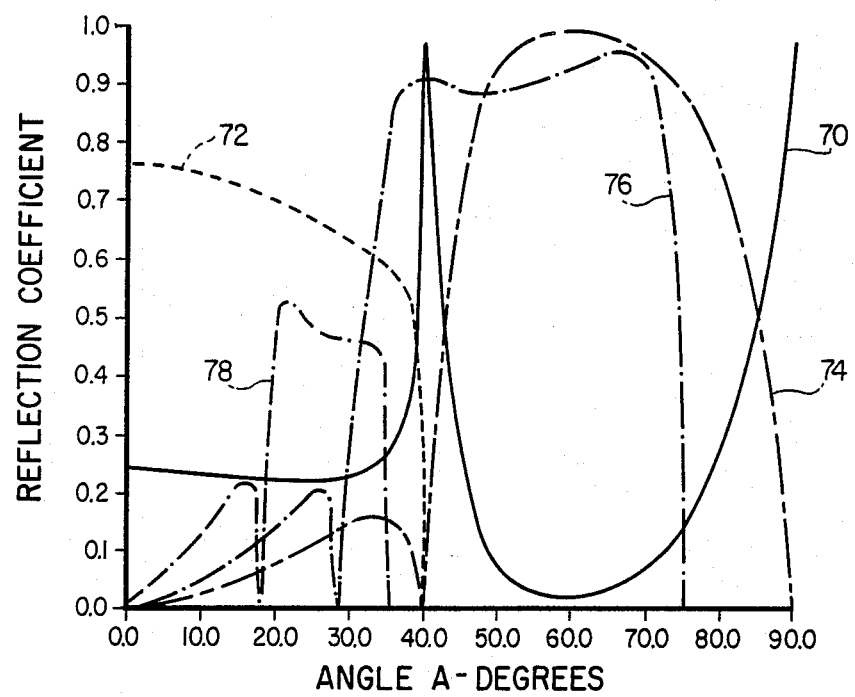
FIG. 5 is a diagram illustrating the reflection coefficient of shear waves and compression waves for various angles of incidence of energy transmitted to the borehole wall using a tool generally in accordance with the present invention.

Referring to FIG. 5, there is illustrated a diagram indicating the transmission of shear wave energy as indicated by the reflection coefficient plotted versus the angle of incidence, A, FIG. 2, in degrees. The total energy transmitted through the wellbore fluid which is transmitted to and initially through the formation material. The curves indicated by the numerals 70, 72 and 74 are based on generating P waves in a borehole fluid having a P velocity of 4800 feet per second, a density of 1.44 and a poisson ratio of 0.5 with a formation material having a P velocity of 7500 feet per second, a shear velocity of 3400 feet per second, a density of 2.7 and a poisson ratio of 0.371. As indicated by the curve 70 the reflection of compressional waves is particularly high between angles of incidence, A, of 45° to 85° and conversely the transmission of shear waves through the formation is also particularly high for this range of angles peaking at essentially 100% for an angle of about 60° as indicated by the curve 74.

The curve 72 as a matter of interest indicates the transmissivity of P waves for mediums having the above described properties. The curve 76 indicates the degree of transmission of shear waves in the instance where the P velocity in the formation is 10,000 feet per second and the shear velocity is 5,000 feet per second and a poisson ratio of 0.333. This indicates a somewhat harder formation material and wherein the range of incident angles is decreased to a range of between 35° and 75° for maximum transmissivity.

The curve 78 indicates the reflection coefficient or percent of transmission of shear wave energy in the instance where the formation medium has a P velocity of 15,270 feet per second, a shear velocity of 8,772 feet per second, a density of 2.6 and a poisson ration of 0.254. Clearly, in the formations having higher acoustic velocities the level of energy transmitted by the formation is much lower, indicating that the torsional wave logging apparatus and process is more appropriate for formation materials having lower range acoustic velocities. The curves plotted in FIG. 5 are based on the Zoeppritz equations which assume that, in the general case when the incident angle is not zero, four waves are generated when a plane wave impinges on an acoustic impedance contrast. As indicated in FIG. 2, for an incident P wave transmitted along the axis 36 a reflected P wave 82 propagates through the medium in the wellbore 12, a transmitted P wave 84 propagates through the formation 14 and a transmitted shear wave 86 also propagates through the formation 14. If a liquid medium is in the wellbore a reflected shear wave does not exist.

Considering the possibility that the conversion of the torsional wave back to a compressional wave will be at relatively weak energy level and that the possible fluids present in a wellbore have a rather restricted velocity range, a torsional wave logging tool such as the tool 10 may be more efficient for formations having shear velocities less than about 8,000 feet per second and preferably in the range of between 3,000 to 5,000 feet per second. In this velocity range the conversion of the compressional wave energy to shear wave energy is clearly higher if an angle of incidence of the compressional wave to the wellbore wall can be maintained in a range of from 35° to 70° with respect to a normal to the wellbore wall at the point of incidence.

Although a preferred embodiment of the present invention has been described herein, those skilled in the art will recognize that various substitutions and modifications may be made without departing from the scope and spirit of the invention as recited in the appended claims.

What is claimed is:

1. Apparatus for determining the shear velocity of an earth formation in the vicinity of a wellbore penetrating said formation and wherein said wellbore is filled at least partially with a liquid medium, said apparatus comprising:

a support member adapted to be lowered into said wellbore and in said liquid medium, said support member adapted to support at least one transducer element for generating acoustic pulses for transmission through said liquid medium toward a wall of said wellbore;

receiver means spaced axially along said wellbore from said transducer element and including means for sensing torsional deflection of said formation with respect to a longitudinal central axis of said wellbore;

said transducer element being positioned on said support member for transmitting a pulse at a selected frequency toward the wall of said wellbore and which pulse, in a plane normal to said axis, impinges said wall at an angle of incidence to said wall with respect to a normal to said wall and which normal intersects said axis, said angle of incidence being greater than zero degrees so as to impart a torsional deflection to said formation with respect to said axis and whereby the elapsed time between the transmission of said pulse and the receipt of a signal related to the deflection of said formation is measurable to determine the shear velocity of said formation between said transducer element and said receiver means.

2. The apparatus set forth in claim 1 wherein:
said apparatus includes a plurality of transducer elements spaced apart circumferentially with respect to said axis and adapted to generate a pulse signal through said liquid medium for impingement on said wall at said angle of incidence to generate said torsional deflection of said formation.

3. The apparatus set forth in claim 2 including:
means for varying said angle of incidence of said signal generated by said transducer element.

4. The apparatus set forth in claim 3 wherein:
said means for varying said angle of incidence includes means for changing said angle of incidence to be in a range of from about 35° to 75°.

5. The apparatus set forth in claim 1 wherein:
said transducer element comprises a flexural element excitable by an electrical signal for generating a compressional wave form in said liquid medium for transmission toward said wall.

6. The apparatus set forth in claim 5 wherein:
said receiver means comprises a plurality of flexural element adapted to be oriented at an angle of incidence with respect to said wall for receiving a compressional wave signal through said liquid medium related to the torsional deflection of said formation in the vicinity of said receiving means.

7. Apparatus for determining the acoustic shear velocity of an earth formation in the vicinity of a wellbore penetrating said formation and wherein said wellbore is filled at least partially with a liquid medium, said apparatus comprising:

a support member adapted to be lowered into said wellbore and in said liquid medium;

a plurality of transducer elements disposed on said support member and spaced apart circumferentially with respect to a longitudinal central axis of said wellbore and adapted to generate an acoustic pulse signal through said liquid medium for impingement on the wall of said wellbore which pulse signal in a plane normal to said axis, is at a selected angle of incidence to said wall with respect to a normal to said wall and which normal intersects said axis, said angle of incidence being greater than zero degrees and less than ninety degrees so as to impart a torsional deflection to said formation with respect to said axis; and receiver means spaced axially along said wellbore from said transducer elements for receiving signals related to said torsional deflection.

8. A method for determining the shear velocity of a region of an earth formation which has been penetrated by a wellbore comprising the steps:

providing an apparatus having transducer means for imparting a compressional acoustic wave through a liquid medium in said wellbore which wave in a plane normal to a longitudinal central axis of said wellbore, impinges on the wall of said wellbore at an angle of incidence with respect to a normal to said wall of said wellbore and which normal intersects said longitudinal central axis, said apparatus having receiver means spaced axially in said wellbore from said transducer means for receiving a signal related to torsional deflection of said formation with respect to said longitudinal central axis in said region;

positioning said apparatus in said wellbore wherein said transducer means is immersed in a liquid medium in said wellbore and exciting said transducer means to generate a compressional acoustic wave through said liquid medium for impingement on said wall at said angle of incidence;

receiving a signal related to torsional deflection of said formation about said longitudinal central axis responsive to the energy imparted to said region of said formation by said compressional acoustic wave.

9. The method set forth in claim 8 including the step of:

positioning said transducer means to direct said compressional acoustic wave toward said wall surface at an angle of incidence in the range of about 35° to 7520 .

10. The methods set forth in claim 8 including the step of:

providing plural transducer means spaced apart circumferentially about said axis, each of said transducer means being oriented at an angle of incidence with respect to a normal to said wall surface of greater than zero degrees, and energizing said transducer means in a predetermined sequence to generate a torsional deflection of said formation with respect to said axis.

* * * * *